Jan. 15, 1924.
L. A. LANG
1,480,940
SERVO MOTOR MECHANISM
Filed March 14, 1919
3 Sheets-Sheet 1
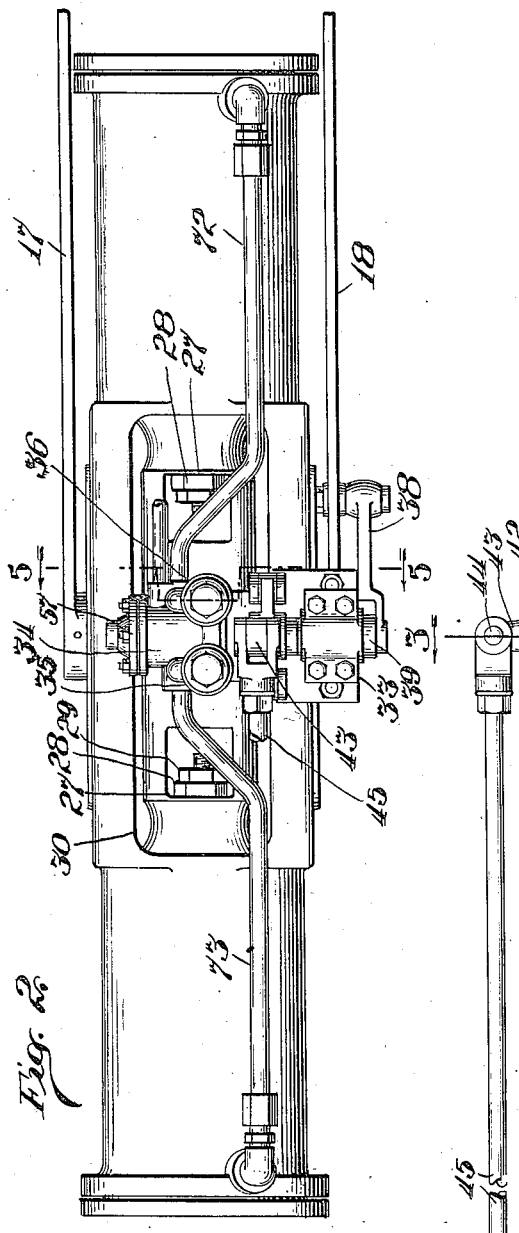
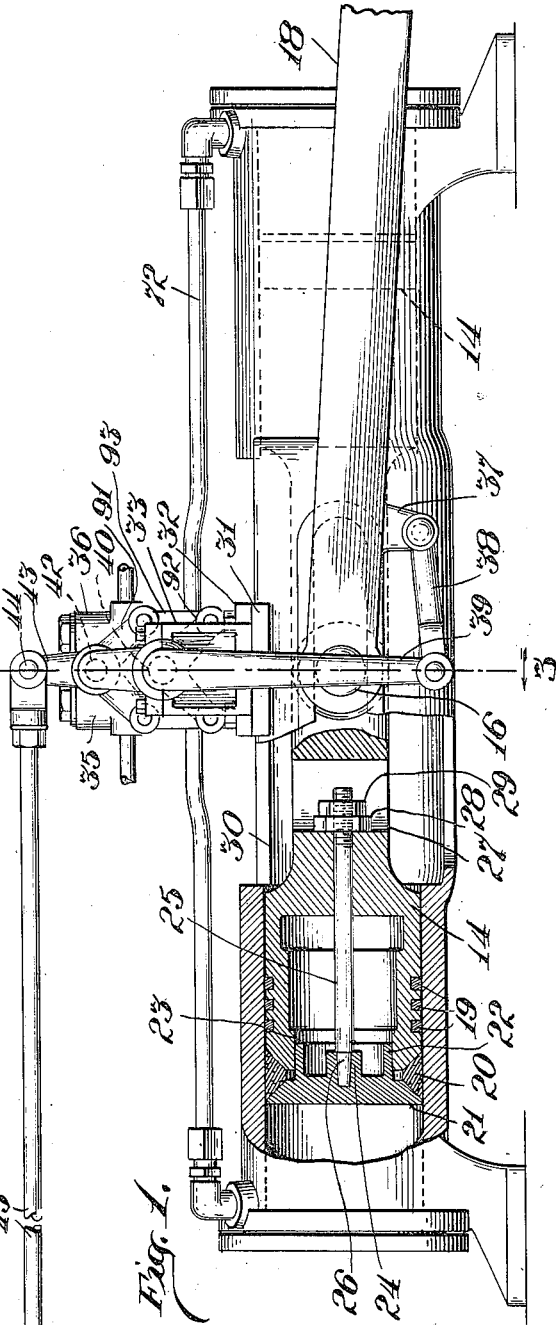
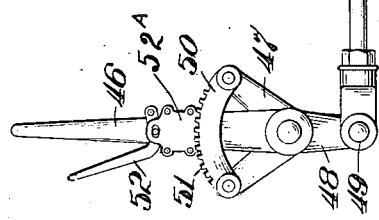
Inventor
Lincoln A. Lang
Offield Towle Graves & Soans
Attorneys.

Jan. 15, 1924.
L. A. LANG
1,480,940
SERVO MOTOR MECHANISM
Filed March 14, 1919
3 Sheets-Sheet 2
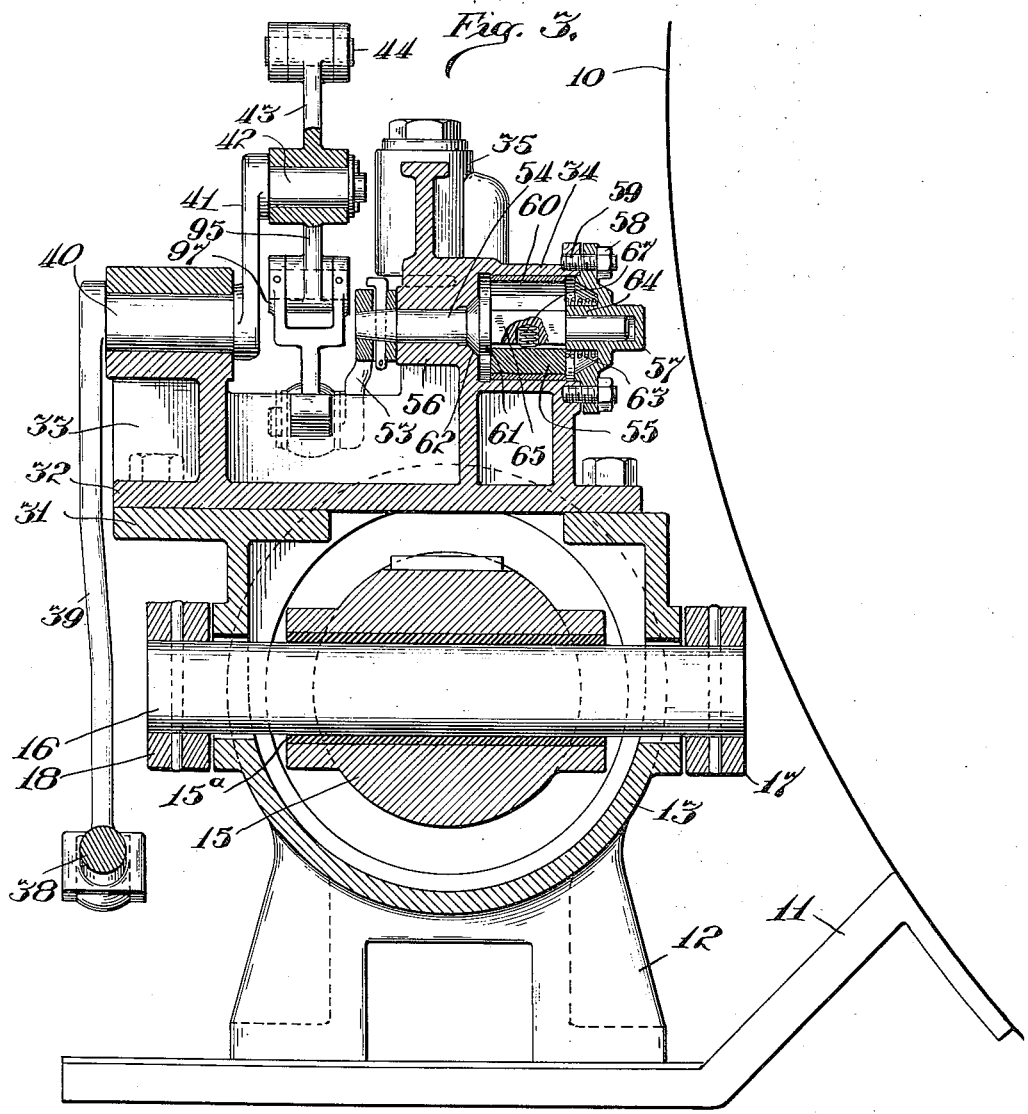
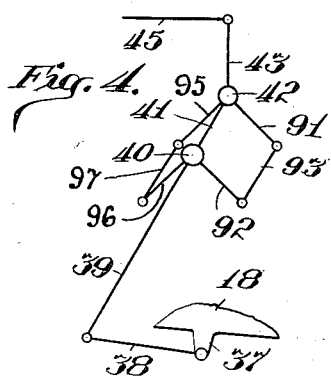
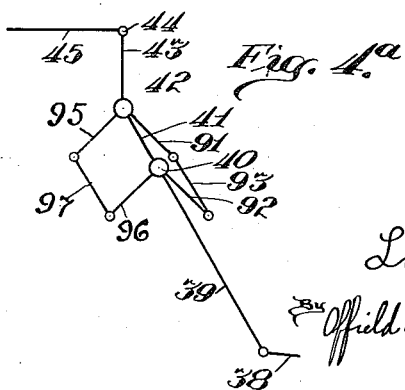

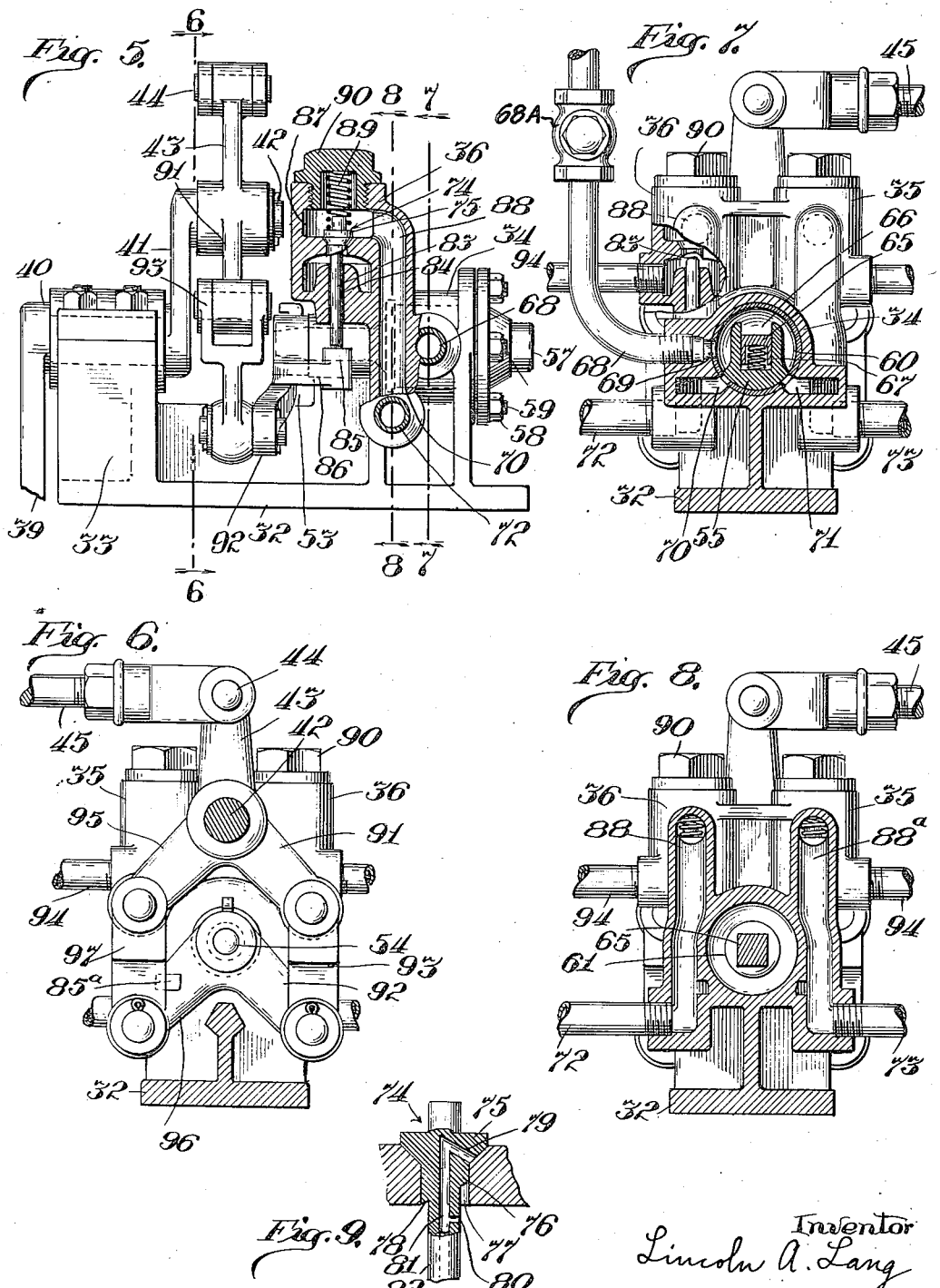

Patented Jan. 15, 1924.

1,480,940

UNITED STATES PATENT OFFICE.

LINCOLN A. LANG, OF PHILADELPHIA, PENNSYLVANIA, ASSIGNOR TO THE NORTHERN TRUST COMPANY, TRUSTEE, OF CHICAGO, ILLINOIS, A CORPORATION OF ILLINOIS.

SERVO-MOTOR MECHANISM.

Application filed March 14, 1919. Serial No. 282,611.

*To all whom it may concern:*

Be it known that I, LINCOLN A. LANG, a citizen of the United States, residing at Philadelphia, in the county of Philadelphia and State of Pennsylvania, have invented certain new and useful Improvements in Servo-Motor Mechanism, of which the following is a specification.

My invention relates to improvements in servo motor mechanism, and particularly to a type of apparatus in which the manual control member and the load member are connected together through a system of links or analogous parts, the arrangement being such that movement of either the manual member or the load member will cause operation of power controlling mechanism to move the load member into a position corresponding with the set position of the manual member.

The principal objects of the invention are to provide an improved form of differential mechanism so organized that the effect upon the power controlling mechanism for a given movement of either the manual member or the load member will always be substantially the same irrespective of the position of said members; to provide an improved mechanism which includes alternative or subsidiary means for avoiding heavy stresses upon the parts of the apparatus and for securing a smooth, positive action without cramping or other ill effects due to the primary means assuming a condition unfavorable to such action; to provide an arrangement which shall be so organized that the heavier portions of the mechanism are so supported as to avoid heavy stress upon and prevent undue wear of the power-controlling mechanism; to provide improved means for regulating the resistance to movement of certain parts of the mechanism and thereby preventing fluttering or hunting effects; to provide an improved servo valve arrangement where pressure fluid is employed for the motive agent; to provide a construction which shall be simple and inexpensive in design and manufacture, and capable of adaptation to a wide variety of purposes, and in general, to provide an improved, practical and efficient mechanism of the character referred to.

In the drawings which illustrate a specific application of my invention as employed in connection with locomotive reverse gears, Fig. 1 is a side elevation of the apparatus parts being shown in section. Fig. 2 is a plan view of the apparatus shown in Fig. 1. Fig. 3 is a section taken on the line 3—3 of Fig. 1. Fig. 4 is a diagram showing the position of the linkage when the piston is at the left. Fig. 4ª is a similar diagram with the piston in its right hand position. Fig. 5 is a section taken on line 5—5 of Fig. 2. Fig. 6 is a section taken on the line 6—6 of Fig. 5. Fig. 7 is a section taken on the line 7—7 of Fig. 5. Fig. 8 is a section taken on the line 8—8 of Fig. 5, and Fig. 9 is a fragmentary section through one of the exhaust valves.

Referring to the drawings, 10 represents the shell of the boiler of an ordinary locomotive to which my invention is shown applied. The servo motor mechanism which in the present case is operated by compressed air is, as to its principal parts, carried by a suitable bracket 11, to which the feet 12 of the power cylinder 13 are securely bolted. Said cylinder in the present case is in effect double acting and is elongated to accommodate an elongated piston member which comprises a pair of axially aligned spaced piston members 14 formed in one piece and connected together by a suitable yoke 15. The yoke 15 is horizontally bored to accommodate a transverse bearing brass 15ª within which is journaled a transverse rod 16 to the opposite projecting ends of which there are keyed the rods 17 and 18 which connect the piston to the link operating member of the locomotive reversing gear.

Each of the ends of the piston, which is symmetrical, as shown in Fig. 1, is fitted with a plurality of ordinary piston rings 19 and in addition is fitted with an outer split ring 20, of triangular cross section, of asbestos or other suitable material which will cause considerable friction when the piston is moved in the cylinder. In order to permit such frictional effect to be controlled or regulated, the end of the piston is constructed with an axially movable cap or head 21 suitably beveled on its inner edge to fit the triangular packing ring 20, and having a reduced cylindrical extension 22 slidable within the bored out portion 23 of the piston 14. Said cap 21 is also formed with an inner central boss 24 drilled axially to accommodate the taper-threaded end of an adjusting rod 25, a pin 26 which passes through said boss 24 and rod 25 serving to prevent unscrewing of said rod. The inner end of said rod 25, which is co-axial with the cylinder and piston, extends through a longitudinal aperture in the piston 14 and through an opening 27 large enough to accommodate a pair of adjusting nuts 28 and 29 threaded on the inner end of said rod 25. Access to said adjusting nuts 28 and 29 is obtained through an opening or hand hole 30 in the top of the cylinder wall, one of said hand holes 30 being preferably provided for each end of the cylinder.

By means of the arrangement just described, the pressure of the fluid in the cylinder automatically maintains a considerable amount of frictional resistance to oppose movement of the piston in the cylinder and thereby secure a stabilized arrangement which will be comparatively unaffected by forces, external or otherwise, tending to cause fluttering or vibratory movements of the piston in the cylinder.

The valve mechanism for the cylinder is mounted on a small platform 31 located centrally of and on the upper side of the cylinder casting. To said platform 31 is bolted a bracket 32 which takes the form of a single casting having a front pedestal 33 behind which are located the housings for the valve members. Said housings comprise an axially horizontal inlet valve housing 34 and a pair of axially vertical exhaust valve housings 35 and 36.

Referring to Figs. 1 and 2, it will be observed that adjacent the left hand end of the side bar 18 it has a small depending projection 37 to which is pivotally connected, by means of a short link 38, the lower end of a swinging lever 39. The said lever 39 is formed at its upper end with a right angle bend as shown best in Fig. 5, journaled in the bearing 40 at the upper end of the pedestal 33, said lever having a short upper extension arm 41 in which is secured a pivot pin 42. The pin 42 constitutes a floating pivot for an upstanding lever 43 to the upper end 44 of which there is pivotally connected the end of an operating rod 45, the position of which is manually controlled by a suitable hand lever 46 in the cab of the locomotive. Said lever 46 is pivoted to a stationary quadrant bracket 47 and has a lower extension 48 to which the rear end of the rod 45 is connected by a pin 49. It will be understood that the quadrant 50 is formed with the usual locking teeth 51 cooperating with a suitable dog 52^A, controlled by a hand latch 52, for maintaining the lever 46 in any desired position.

The inlet and exhaust valves are operated by a single rocker member 53 pivoted on a horizontal axis co-axial with the axis of the bearing 40. Said rocker member 53 is keyed to the end of a rock shaft 54 which operates the rotary inlet valve 55. Said rocker shaft 54 is as to its front end journaled in a boss 56 of the main valve housing casting and as to its rear end is reduced in diameter to form a journal rotatable in the valve cover 57, said valve cover 57 being suitably secured to the rear end of the valve housing 34 by means of nuts 58 on studs 59. Within the air-chest 60, the valve stem 54 is enlarged as shown at 61, said enlargement being beveled as to its front portion to fit a corresponding beveled seat 62, in the front end of said air chest 60. The shoulder on said enlargement 61 constitutes means for positioning the valve 55 which is forced forwardly by means of a coiled compression spring 63 surrounding the internal boss 64 on the cover 57. In order to impart rotary movement to the valve 55 when its stem 54 is rocked by the member 53, the intermediate portion 65 of the valve stem is made rectangular, as shown best in Fig. 7, to fit a slot 66 milled in the upper surface of the rotary valve 55. Preferably the valve 55 is maintained in tight fitting engagement with the peripheral wall of the chest by means of a small coiled compression spring 67 located in a small cylindrical aperture drilled vertically upward in the bottom face of said rectangular stem portion 65.

Compressed air is admitted into the chest 60 by means of a suitable inlet pipe 68 communicating with a side aperture 69 through the wall of the valve housing 34. A check valve 68A prevents reverse flow of said air. Normally, the valve 55, which is of the usual segmental type, just covers the inlet ports 70 and 71 which lead to the respective ends of the cylinders through suitable pipes 72 and 73.

The exhaust valves which are contained in the housings 35 and 36 are precisely alike and therefore one only will be described. Referring to Figs. 5 and 9, it will be noticed that the exhaust valve 74 has the usual mushroom head 75, but below said head is enlarged, as shown at 76, in order to fit the cylindrical exhaust passage-way 77. Said cylindrical enlargement 76, however, is cut away obliquely as shown at 78, so that at one side thereof it is of smaller facial depth than on the other side. Also, it will be observed that by reason of a pair of radially drilled openings 79 and 80, the inner ends of which communicate with a central, longitudinal bore 81 in the valve stem 82, a by-pass of restricted capacity is formed in the valve, said by-pass, however, not being effective until the valve is raised slightly from its seat.

The object of the said by-pass is to insure a definite though restricted amount of opening when the valve is initially actuated and before the main exhaust passage 77 becomes effective. By inspection of Fig. 9 it will, of course, be manifest that until the valve stem has been raised a sbstantial distance, the enlargement 76 will prevent passage of fluid through the passage-way 77, even though the valve has been raised a substantial distance off its seat. It will also be noted that by reason of the oblique cut-away of the said enlargement 76, the passageway 77 is opened gradually and does not become fully effective until the valve stem has been moved vertically a still greater distance. This particular form of exhaust valve construction is of considerable importance in preventing fluttering or improper movement of the piston in its cylinder when acted upon by external forces while at the same time the full area of the valve opening is available for effecting prompt movements of the piston when the hand control member is suitably actuated.

Each exhaust valve stem 83 is vertically slidable in a guide 84 formed as an integral part of the lower end of the exhaust valve housing, and its lower end is located substantially in the same horizontal plane as the axis of the rotary valve stem 54. Said exhaust valve stems 83 are actuated by small tappets 85 carried at the ends of a pair of offset lugs 86 formed as integral parts of the rocker member 53, the arrangement being such that pivotal movement of the rocker member 53 will cause one or other of the exhaust valves 83 to open. Each of the exhaust valves is as to its head, located in a cavity 87 in the exhaust valve housing, said cavity communicating with the proper end of the cylinder through a vertical cored conduit 88 formed in the valve housing casting. Preferably each exhaust valve is normally seated by a coiled compression spring 89, the upper end of which extends into a cylindrical aperture bored in the movable cap or cover 90 screwed into the top of the exhaust valve housing.

I will now describe the link mechanism through the medium of which the valve operating rock member is actuated by differential movement of either the manual control member or the load member, i. e., the piston. The lever 43, as shown best in Figs. 1, 5 and 6, is provided with an extension arm 91 which forms an angle with the arm 43, said parts constituting, in effect, a bell crank. The arm 91 of said bell crank is of the same effective length as an arm 92 which constitutes an integral part of the valve rocker member 53. Arms 91 and 92 are also parallel and are pivotally connected together at their outer ends by means of a link 93, the length of said link 93 being equal to the distance between the center of the pin 42 and the axis of the bearing 40. It will be observed that the short arm 41 of the load member 39 constitutes, in effect, one of the links of a link parallelogram, the other links of which are the arms 91, 92 and 93.

Before completing the description of the preferred form of link mechanism, I will describe the operation of the parts and the mechanism heretofore referred to. Assuming that the apparatus is in the condition and position illustrated in the drawings, and that it is desired to move the piston towards the left of Fig. 1, the lever 46 is moved towards the left, the effect of which is to throw the manual control rod 45 towards the right. Such movement causes a corresponding rocking movement of the arm 43 and presses the bell crank arm 91, thereby causing a corresponding rocking movement of the valve rocker arms 92. Such movement of the rocker member of the arm 92 and rocking member 53 will effect a slight rocking action of the valve 55 opening the inlet port 70 and allowing compressed air to flow into the right hand end of the cylinder. It should have been stated that under normal conditions the pressure of fluid in each end of the cylinder is substantially equal to the pressure of the supply for the reason that the inlet valve is barely sufficient in size to cover both of the inlet ports 70 and 71. The fluid is at the same time exhausted from the left hand end of the cylinder by reason of the left hand tappet 85, raising the exhaust valve in the housing 35, which permits the air to rush out of the left end of the cylinder through pipe 73, conduit 88<sup>A</sup>, past the exhaust valves and into exhaust pipe 94. Thereupon the piston moves towards the left of the cylinder and continues its movement until the lever 43 is restored to vertical position, whereby the rocker member 53 is itself restored to normal and the motion of the piston is consequently arrested due to the resulting closing of the left hand exhaust valve and the centralizing of inlet valve 55.

Fig 4 shows the position of the links 41, 91, 93 and 92 when the piston is located in its extreme position towards the left hand of Fig. 1, where it will be observed that the link parallelogram 41, 91, 92 and 93 is swung around the fixed axis 40 in a clock-wise direction, the shape of the parallelogram being thereby changed substantially. The angle between the arms 43 and 91 in the present instance is such that the linkage is in very favorable position for effective, positive and noncramping action when the piston is in its extreme left hand position, as indicated in Fig. 4. Manifestly, when the parts are in the position shown in Fig. 4ª with the piston in its extreme right hand position, the link parallelogram 41, 91, 93 and 92 is attenuated to such an extent that the condition is somewhat unfavorable for proper operation. This difficulty is overcome by duplicating the link parallelograms 41, 91, 93 and 92, the arrangement being such that when the parts are in the position where one of the parallelograms is at a mechanical disadvantage, the other parallelogram of links is in a highly advantageous position for effective operation. This subsidiary or alternative linkage is arranged symmetrically with reference to the links 91, 92 and 93, but on the opposite side of the vertical plane passing through the axis of the bearing 40. Such linkage comprises an arm 95 on the lever 43 and similar to the arm 91, an arm 96 on the rocker member 53 similar to the arm 92, and a link 97 pivotally connecting the outer ends of the arms 95, 96 and similar to the link 93.

The alternative or subsidiary effect of the two systems of linkage with reference to each other is clearly shown by inspection of the diagrams in Figs. 4 and 4ª heretofore referred to. It will also be noticed that when the parts are in equilibrium, no matter what may be the inclination of the lever 39, the rocker member 53 and the manual control lever 43, though they may be offset relative to each other as shown in Fig. 4 or 4ª, are always in the same position relative to the vertical, so that the valve mechanism will always be acted upon to the same extent for a given amount of movement of the control rod no matter what may be the position of the piston or hand lever.

Unlike some other forms of servo-motor valve linkage, the weight of the comparatively heavy lever 39 is carried by a substantial stationary bearing of ample size, the floating pivot 42 simply supporting the comparatively light lever 43.

The described details of construction are merely illustrative of a single application of my invention to a specific purpose. Hence, it will be understood that the scope of the invention herein disclosed should be determined by reference to the appended claims.

I claim:

1. In servo motor mechanism, a load-member, a source of power for moving said load-member, four links pivotally connected together to form the sides of a parallelogram, one of said links constituting an operating arm; power controlling mechanism operated by said arm, another of said links constituting a rocking arm operated by the load member, and a manually operated member suitably connected to said parallelogram to change the shape thereof and thereby rock said operating arm.

2. In servo-motor mechanism, four links connected pivotally to form the four sides of a link parallelogram, a load member, a rotary axially fixed power-controlling mechanism actuated by angular movement of one of said links, another of said links constituting a rocking arm actuated by the load member and a manually operated member so connected to said parallelogram that movement thereof will change the shape of said parallelogram and thereby effect movement of said power controlling mechanism.

3. In servo-motor mechanism, the combination of a pair of links of equal length arranged in parallelism, a second pair of links also parallel and connecting together the ends of the first pair to constitute a link parallelogram, a cylinder, a piston therein, a manual control member suitably connected to one of said links to rock the same; servo-valve mechanism operated by angular movement of one of said links, and means for effecting angular movement of another of the said links directly actuated by movement of the piston.

4. In servo-motor mechanism, the combination of a set of four links pivotally connected together to form the sides of a floating link parallelogram, one corner of said parallelogram being stationary, one of the links pivoted at said corner constituting an operating arm, a manual control member, a load member, power mechanism for moving said load member and controlled by rocking movement of said operating arm, another of said links being directly and positively operated by the load member and means connecting said manual control member to a link of said parallelogram remote from said corner, whereby movement of said manual control member will change the shape of said parallelogram and rock said operating arm to actuate said power controlling mechanism.

5. In servo-motor mechanism, four links pivotally connected together to form the sides of a parallelogram, one of said links constituting an operating arm; servo-motor mechanism controlled by said arm, another of said links constituting a rocking arm operated by the load member, a manually operated member suitably connected to said parallelogram to change the shape thereof and thereby rock said operating arm; a pair of parallel arms of equal length forming rigid extensions of a parallel pair of said links and a link pivotally connecting the outer ends of said extensions.

6. In servo-motor mechanism, a pair of similar double-armed parallel levers, two parallel links pivotally connecting respectively the ends of one lever with the corresponding ends of the other lever, means for maintaining the intermediate pivotal points of said levers the same distance apart, said links and said means constituting with said levers in effect a pair of floating link parallelograms having a common rocking base, said base being stationarily pivoted, one of the sides of one of said parallelograms pivoted on said pivot, constituting an operating arm, a manual control member, power controlling mechanism actuated by said operating arm, means connected to said load member for changing the shape of said parallelogram and thereby actuate said operating arm, and means connecting said manual control member to one of said parallelograms to change the shape thereof.

7. In servo-motor follow-up apparatus, the combination of a cylinder, a piston therein, a load member movable by said piston, a lever stationarily pivoted and connected to said load member whereby movement of the latter will rock said lever on its pivotal axis; valve mechanism for controlling the pressure fluid in said cylinder for moving said piston, a stationarily pivoted rocker arm for operating said valve mechanism, a bell crank, a manual control member connected to one of the arms of said bell crank, a link, an arm on said lever, said last named arm, said link, said rocker arm and the other arm of said bell crank being pivotally connected together to form a link parallelogram floating around the stationary axis of said first lever, the arrangement being such that pivotal movement of said bell crank, due to said manual control member, or pivotal movement of said first lever, due to movement of the load member, will change the shape of said link parallelogram and so effect an operative rocking movement of the valve rocker member.

8. In servo-motor mechanism, the combination of a cylinder, a piston therein, a load member connected to said piston, a stationarily pivoted lever connected to said load member, valve mechanism for controlling the fluid admitted to said cylinder to move said piston, a rock member stationarily pivoted coaxial with said lever for operating said valve mechanism, a bell crank pivoted on said lever on an axis spaced from the lever pivot, a manual control member connected to one of the arms of said bell crank, and a link connecting the other arm of said bell crank with said rock member, the rocker member and said last named arm being parallel and equal in length.

9. In a fluid motor operating valve and control mechanism, a plurality of right angled bell cranks, links pivotally connecting the adjacent ends of the bell cranks, equally spaced arms on one of the bell cranks, an upstanding arm constituting an operating arm, a swinging journal bearing for the said bell crank, means for swinging the journal of the bell crank, rotatable means for supporting the other bell crank, a valve stem made integral with a conical valve which is adapted to rotate with the stem, a valve seat for the valve, a rotatable valve positioned on the stem, a removable valve seat cooperating with the valve, inlet and outlet ports in the valve seat and means for holding the valve on the valve seat.

10. In combination with an elastic fluid motor, a cylinder, a double-ended piston adapted to reciprocate within the cylinder, means for automatically increasing the friction between the cylinder walls and the piston, a plurality of bell cranks having equal length arms position equidistant from each other, an upstanding operating arm, pendant links pivotally connecting the adjacent ends of the bell cranks, a rotary inlet valve adapted to be operated by one of the bell cranks, tappets protruding from the arms of the said bell crank, a tappet valve rod and a graduated poppet valve adapted to be operated by the tappet and resilient means for closing the valve.

LINCOLN A. LANG.